United States Patent
Fiekens et al.

(10) Patent No.: US 10,829,373 B2
(45) Date of Patent: Nov. 10, 2020

(54) OZONE GENERATION AT HIGH PRESSURES

(71) Applicant: Xylem IP Management S.à r.l., Senningerberg (LU)

(72) Inventors: Ralf Fiekens, Schloß Holte-Stukenbrock (DE); Reiner Fietzek, Herford (DE); Manfred Salvermoser, Herford (DE); Nicole Brüggemann, Enger (DE)

(73) Assignee: Xylem IP Management S.à r.l., Senningerberg (LU)

( * ) Notice: Subject to any disclaimer, the term of this patent is extended or adjusted under 35 U.S.C. 154(b) by 141 days.

(21) Appl. No.: 15/998,894

(22) PCT Filed: Feb. 8, 2017

(86) PCT No.: PCT/EP2017/052752
§ 371 (c)(1),
(2) Date: Aug. 16, 2018

(87) PCT Pub. No.: WO2017/140556
PCT Pub. Date: Aug. 24, 2017

(65) Prior Publication Data
US 2019/0233285 A1 Aug. 1, 2019

(51) Int. Cl.
*C01B 13/11* (2006.01)
(52) U.S. Cl.
CPC .......... *C01B 13/11* (2013.01); *C01B 2201/22* (2013.01); *C01B 2201/64* (2013.01)
(58) Field of Classification Search
None
See application file for complete search history.

(56) References Cited

U.S. PATENT DOCUMENTS

| | | | | |
|---|---|---|---|---|
| 4,232,229 A | * | 11/1980 | Tanaka | C01B 13/11 422/186.2 |
| 5,955,038 A | * | 9/1999 | Gadow | C01B 13/11 422/186.07 |

(Continued)

FOREIGN PATENT DOCUMENTS

| | | |
|---|---|---|
| DE | 102011008947 A1 | 7/2012 |
| EP | 2835347 A1 | 2/2015 |

(Continued)

OTHER PUBLICATIONS

International Search Report and Written Opinion for International Application No. PCT/EP2017/052752, dated May 4, 2017—11 pages.

(Continued)

*Primary Examiner* — Kishor Mayekar
(74) *Attorney, Agent, or Firm* — RatnerPrestia

(57) ABSTRACT

A method for producing ozone at elevated pressure with a capacity of at least 1 kg ozone/hour by an ozone generator having a high voltage electrode and a counter electrode. The electrodes delimit a gap in which a dielectric is arranged and through which a gas containing oxygen and having a gas pressure of $p_{gas}$ flows. The high voltage electrode and the counter electrode with a connection for an electric power supply to generate discharges are provided in at least one discharge gap. The power supply provides a voltage in a range from 1 kV to 50 kV and wherein stroke widths di of the discharge are distributed between a minimum stroke width $d_{min}$ and a maximum stroke width $d_{max}$. The gas pressure $p_{gas}$ of the gas containing oxygen at the outlet of the ozone generator is at least 3 bar.

14 Claims, 2 Drawing Sheets

(56) References Cited

U.S. PATENT DOCUMENTS

Figure 1:
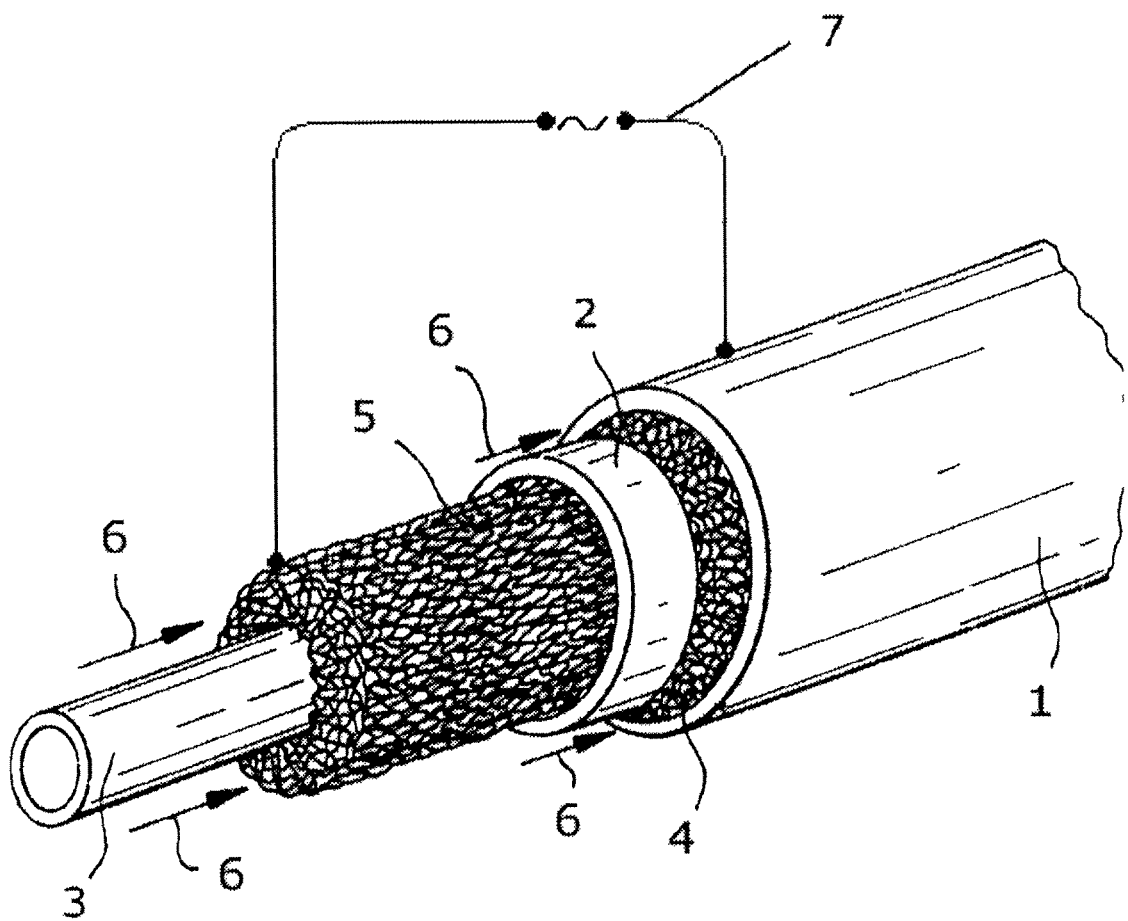

| | | |
|---|---|---|
| 8,728,402 B2 | 5/2014 | Vezzu |
| 9,174,188 B2 | 11/2015 | Fietzek et al. |
| 2008/0193343 A1* | 8/2008 | Vezzu .................. C01B 13/11 422/186.18 |
| 2009/0236042 A1 | 9/2009 | Wada et al. |
| 2013/0313106 A1* | 11/2013 | Nakatani ............. C01B 13/11 204/176 |
| 2015/0004070 A1 | 1/2015 | Murata et al. |
| 2015/0021162 A1* | 1/2015 | Wada .................. C01B 13/11 204/176 |
| 2016/0236933 A1 | 8/2016 | Murata et al. |

FOREIGN PATENT DOCUMENTS

| | | |
|---|---|---|
| WO | 2007014473 A | 2/2007 |
| WO | 2013136663 A1 | 9/2013 |

OTHER PUBLICATIONS

Haverkamp, R.G., et al., "Ozone production in a high frequency dielectric barrier discharge generator," Jun. 15, 2002, pp. 321-328, vol. 24, Ozone Science & Engineering.

Kitayama, J., et al., "Effects of discharge gap width and gas pressure on ozone generation characteristics of an air-fed ozone generator," 1997, pp. 791-796, Proceedings 13th Ozone World Congress, Kyoto.

\* cited by examiner

OZONE GENERATION AT HIGH PRESSURES

CROSS-REFERENCE TO RELATED APPLICATIONS

This patent application is a U.S. National Phase patent application of PCT Application No.: PCT/EP2017/052752, filed Feb. 8, 2017, which claims priority to European Patent Application No. 16156070.1, filed Feb. 17, 2016, each of which is incorporated by reference herein in its entirety.

FIELD OF THE INVENTION

The present invention relates to a method for producing ozone at elevated pressure.

BACKGROUND OF THE INVENTION

High pressures at the outlet of the ozone generator of up to 12 bar are needed in some areas of application of ozone. This includes, for example, the bleaching of paper in the paper industry. Ozone generators with ozone capacities of several kg/h at working pressures of around 1-2 bar are generally used to bleach paper.

The unit "bar" will be used as a technical unit of pressure in this description and claims. This is to be understood as excess pressure over atmospheric pressure. The numerical value of the absolute pressure which is to be distinguished from this is 1013 mbar greater.

An ozone generator of this type is for example known from application document WO/2013/136663. A tubular high voltage electrode is surrounded by a tubular dielectric and a tubular counter electrode. The electrodes are arranged in a concentric manner relative to one another. The dielectric is on the inside of the counter electrode. A gas containing oxygen flows through the gap between the dielectric and the high voltage electrode. Silent discharges develop between the dielectric and the high voltage electrode during operation. The distance between the dielectric and the high voltage electrode is called the gap width or stroke width. The ozone generator can be operated at a gas pressure of between 1.2 and 3.2 bar with a gap width of 0.5 mm. If the gap width is decreased by 0.2 mm, the pressure range is between 2 and 5.3 bar. The voltage necessary for ignition increases while the gap width remains the same as the gas pressure increases. This effect can be compensated for by decreasing the gap width. For production-related reasons, the gap in this type of ozone generators cannot be arbitrarily decreased to ensure operation at high pressures. Furthermore, only power supplies of up to around 20 kV can be used due to insulation problems. Conventional ozone generators are therefore limited to a pressure range as a result of the maximum voltage and the minimum gap width.

The profitability of ozone generation also plays an important role. This type of ozone generators no longer reach ozone concentrations that are as high as the pressure increases while the efficiency of the ozone generation decreases as the pressure falls. Economic ozone production and the generation of high concentrations of ozone is therefore not possible at high pressures. Conventional ozone generators have an optimal operating pressure depending on the ozone concentration ("Effects of discharge gap width and gas pressure on ozone generation characteristics of an Air-Feed-Ozone generator", J. Kitayama et al., Proceedings 13th Ozone World Congress, Kyoto). Any deviations from this optimal operating pressure result in considerable reductions in efficiency ("Ozone production in a high frequency dielectric barrier discharge generator", R. G. Haverkamp et al., Ozone Science & Engineering Vol. 24, pp 321-328). Higher operating pressures are therefore uneconomical for conventional ozone generators.

Water ring compressors are used to compress the ozone to the necessary pressure. However, these compressors are expensive to buy and consume high quantities of energy.

SUMMARY OF THE INVENTION

The object of the present invention is to provide a method for the production of ozone at elevated pressure in which high ozone concentrations and high ozone capacities can be achieved effectively.

According to this a method is provided for the production of ozone at elevated pressure with a capacity of at least 1 kg ozone/h by means of an ozone generator having a high voltage electrode and at least one counter electrode, wherein the high voltage electrode and the at least one counter electrode delimit a gap in which at least one dielectric is arranged and through which a gas containing oxygen and having a gas pressure of $p_{gas}$ flows, and wherein the high voltage electrode and the at least one counter electrode with a connection for an electric power supply to generate discharges are provided in at least one discharge gap, wherein the power supply provides a voltage in a range from 1 kV to 50 kV and wherein stroke widths di of the discharge are distributed between a minimum stroke width $d_{min}$ and a maximum stroke width $d_{max}$, wherein the gas pressure $p_{gas}$ of the gas containing oxygen at the outlet of the ozone generator is at least 3 bar. This method can be used to produce ozone at elevated pressure with a high ozone concentration and high ozone capacity in an economic manner without using water ring compressors.

The power supply preferably provides a voltage in the range of between 10 kV and 30 kV, preferably between 15 kV and 20 kV. Power suppliers of this magnitude can be used in industry and are accordingly cost-efficient. Furthermore, an ozone concentration of at least 10% by weight is preferably achieved.

In an embodiment the gas pressure $p_{gas}$ of the gas containing oxygen is at least 6 bar and in an advantageous embodiment the gas pressure $p_{gas}$ is between 10 bar and 12 bar.

The gas containing oxygen is preferably at least 80% $O_2$ and more preferably at least 98% $O_2$. This means high ozone concentrations can be produced with good energy efficiency.

The ozone is preferably produced with a production rate of at least 20 kg of ozone/h and in particular 100 kg of ozone/h. At this capacity, an ozone generation system of the type mentioned above is particularly effective.

It is advantageous if the gas containing oxygen flows into the gap at a feed-in rate in the range from 500 kg/h $O_2$ to 800 kg/h $O_2$.

In an advantageous embodiment the minimum stroke width is zero mm. The stroke width distribution is preferably continuously and periodically or stochastically distributed.

The ozone generator preferably has its own counter electrode and the dielectric is arranged in the system on the counter electrode. This arrangement is a classic one-gap system.

The distribution of stroke widths is preferably formed by a fabric made of wire. The term "fabric" (woven or non-woven fabric) is known from textiles technology. A textile fabric can refer to any planar structure made from textile raw materials using a textile technology. Accordingly, in the context of the present patent application a fabric is understood to mean any flat, curved or convex planar structure manufactured using a textile technology. These include, inter alia, non-woven fabrics, such as tissue, knitted fabrics, meshes and nets, and fibre composite fabrics such as non-wovens and cotton wool.

It is advantageous if the fabric made of wire fills the gap.

The high voltage electrode is preferably formed at least in part from the fabric. It is also possible to provide for the fabric forming the full high voltage electrode.

BRIEF DESCRIPTION OF THE DRAWING FIGURES

Figure 2:
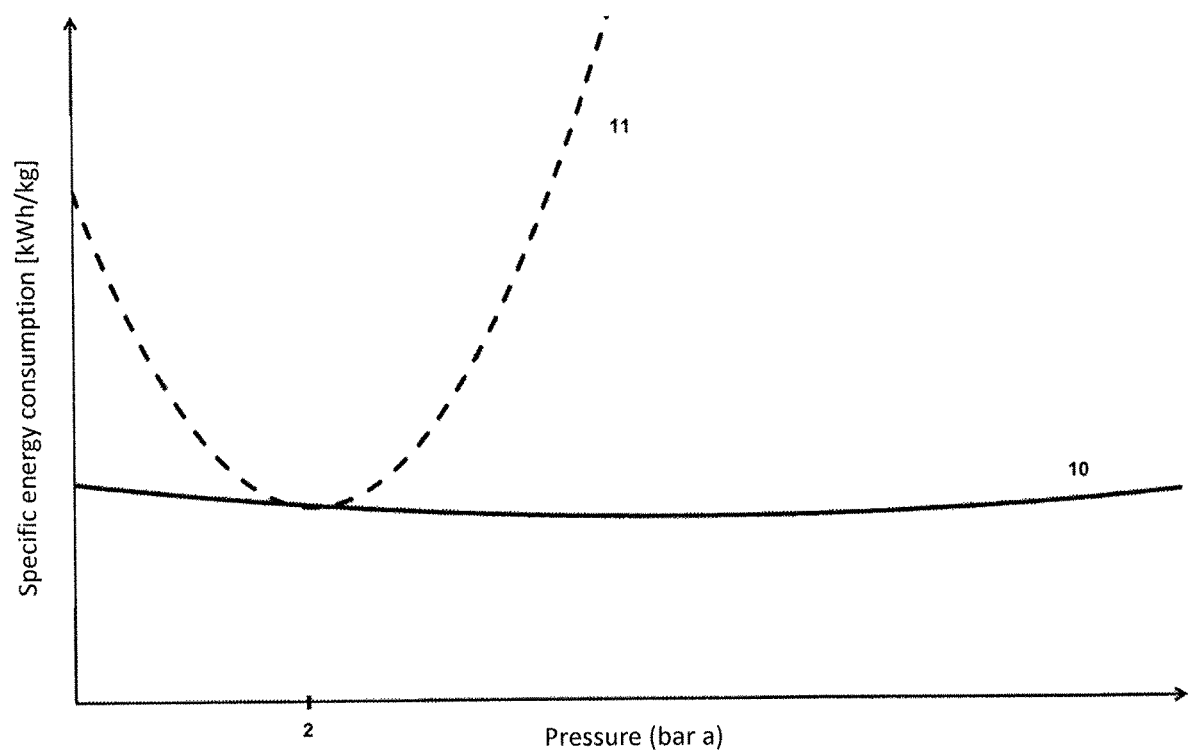

A preferred embodiment of the invention is described below in more detail with reference to the drawings. In the drawings:

FIG. 1: shows a perspective view of an electrode arrangement from the prior art and FIG. 2: shows a basic progression of the energy consumption of a conventionally operated ozone generator and an ozone generator operated with the method according to the invention by gas pressure.

DETAILED DESCRIPTION OF THE INVENTION

FIG. 1 shows an electrode arrangement as known from DE 10 2011 008 947 A1. Ozone generators of this type are used in an ozone generator in groups. The ozone generators are thereby arranged parallel to one another between two tube plates in the manner of a tube bundle heat exchanger and connected in an electrically parallel manner. The ozone generator shown has a tubular outer electrode 1, an also tubular dielectric 2 and an internal rod 3, wherein shortened versions of the individual components are shown stretched out from one another in an axial direction. The arrangement is rotationally symmetrical. The outer electrode 1, the dielectric 2 and the rod 3 are oriented concentrically to one another. There is a wire mesh 4 between the outer electrode 1 and the dielectric 2 that fills the gap. Accordingly, a wire mesh 5 is provided between the dielectric 2 and the rod 3 which also fills the gap there. The outer electrode 1 is designed in the form of a stainless steel tube. The waste heat generated during the ozone production is cooled by means of cooling water which is passed along the outer side of the outer electrode between the bases of the tubes. The dielectric 2 is a glass tube. The wire meshes 4 and 5 are preferably manufactured as what are known as circular hollow strings made of a stainless steel wire mesh. The rod 3 arranged in the centre of the electrode arrangement is an insulator, for example made of glass of another material compatible with oxygen and ozone. The rod 3 can be designed to be massive. During operation, pressure is exerted on the electrode arrangement by means of a gas containing oxygen having a gas pressure of 1 to 2 bar which flows through the wire meshes 4 and 5 in the direction of the arrow 6. An electric power supply 7 is schematically indicated, which power supply is in contact with the outer electrode 1 on the one side and with the mesh 5 on the other. The operating voltage supplied by the power supply 7 a silent electrical discharge in the space between the electrodes 1, 5 and the dielectric 2 which generates ozone from the oxygen flowing through the meshes 4 and 5 in the direction of the arrow 6.

In the structure shown the inner electrode is formed solely from the mesh 5 while the rod 3 exercises a supporting function as an insulator which ensures the even filling of the inside of the dielectric 2 with the wire mesh 5. This shape of the electrode results in an overlapping of volume and surface charge.

FIG. 2 shows curves of the specific energy consumption of ozone generators. With reference to the method according to the invention, $U(t)=U_0*\sin(2\pi*f*t)$ even at comparatively high gas pressures and voltage amplitudes (in the range indicated), there are still surface points on the high voltage electrodes from which silent discharges originate. It is surprising in this context that the specific energy consumption of the ozone generator measured in kWh/kg of ozone is significantly lower as a result of this operation 10 according to the invention at high pressures compared to conventional ozone generators 11. The above-mentioned characteristic optimal operating pressure for ozone generators described above depending on the specific energy consumption is in a narrow range about the minimum of a parabolic distribution (see curve 11). In contrast to this, an ozone generator with a profiles high voltage electrode has a significantly flatter distribution (see curve 10). The specific energy consumption is still comparatively low at high pressures, for example of more than 3 bar, or even higher pressures. Since the minimum distribution is flatter, the operating pressure can be in a wide range, for example in a range from 1 to 12 bar with almost the same level of efficiency in terms of ozone generation.

The advantage of this method is further that no compromise has to be made between gas pressure and capacity and/or ozone concentration.

According to the invention the ozone generator is operated at capacities of one to several hundred kg of ozone/h. In one embodiment the ozone concentration is at least 12% by weight ozone.

The method according to the invention is therefore suitable for ozone production in the paper industry as high ozone concentrations and high ozone capacities can be produced effectively at high pressures.

The high voltage electrode is an electrically conductive material, preferably stainless steel with a profiled surface. The high voltage electrode can be a wire mesh or a knitted fabric, a fabric or even a wire winding or a granulate placed on a surface. Fibrous fabrics such as fleece or felts are also suitable as structures that are placed on the electrode by means of mechanical processing or by coating. The profiling is stochastically or periodically distributed and is distributed in both a longitudinal and a peripheral direction of the electrode.

It is also conceivable, however, to profile the dielectric instead of the electrode, with the same effect being able to be achieved.

The method according to the invention is not limited to tubular electrode arrangements. It can be used in both tubular and flat ozone generators. Use in single-gap and multi-gap systems is provided for. The electrically conductive material of the electrode can be introduced into the discharge hap with or without carrier material.

The method of ozone generation according to the invention can of course also be used more generally in plasma generators.

The ozone generator can be adapted to customer-specific requirements by means of the method according to the invention. This is economical due to the increasing energy prices, and is also ecologically advantageous. Ozone generation at the high pressures at the outlet of the ozone generator of up to 12 bar are technically and economically possible. The water ring compressors that are usually required are therefore not necessary.

The invention claimed is:

1. A method for producing ozone at elevated pressure with a capacity of at least 1 kg ozone/hour by an ozone generator having an inlet, an outlet, a high voltage electrode and at least one counter electrode, wherein the high voltage electrode and the at least one counter electrode delimit a gap in which at least one dielectric is arranged, said method comprising the steps of:

distributing a gas containing oxygen through the gap,
generating discharges in at least one discharge gap using the high voltage electrode and the at least one counter electrode, which are each connected to an electric power supply, and
providing a voltage using the power supply in a range from 1 kV to 50 kV,
wherein stroke widths $d_i$ between the dielectric and the high voltage electrode are distributed between a minimum stroke width $d_{min}$ and a maximum stroke width $d_{max}$, and
wherein gas pressure $p_{gas}$ of the gas containing oxygen at the outlet of the ozone generator is at least 3 bar in excess of atmospheric pressure.

2. The method according to claim 1, wherein the voltage provided using the power supply is in a range from 10 kV to 30 kV.

3. The method according to claim 1, wherein the voltage provided using the power supply is in a range from 15 kV to 20 kV.

4. The method according to claim 1, wherein the gas containing oxygen has an ozone concentration of at least 10% by weight at the outlet of the ozone generator.

5. The method according to claim 1, wherein the gas pressure $p_{gas}$ of the gas containing oxygen is at least 6 bar in excess of the atmospheric pressure at the outlet of the ozone generator.

6. The method according to claim 1, wherein the gas pressure $p_{gas}$ of the gas containing oxygen is between 10 bar and 12 bar in excess of the atmospheric pressure at the outlet of the ozone generator.

7. The method according to claim 1, wherein the capacity is at least 20 kg ozone/hour.

8. The method according to claim 1, wherein the capacity is at least 100 kg ozone/hour.

9. The method according to claim 1, comprising distributing the gas containing oxygen into the gap at a feed-in rate in the range from 500 kg/hour $O_2$ to 800 kg/hour $O_2$.

10. The method according to claim 1, wherein the minimum stroke width $d_{min}$ is zero.

11. The method according to claim 1, wherein the ozone generator has a single counter electrode and the dielectric is arranged on the counter electrode.

12. The method according to claim 1, wherein the high voltage electrode comprises at least in part a fabric made of wire.

13. The method according to claim 12, wherein the high voltage electrode consists of the fabric made of wire.

14. The method according to claim 1, further comprising a fabric made of wire filling the gap delimited by the high voltage electrode and the at least one counter electrode.

* * * * *

UNITED STATES PATENT AND TRADEMARK OFFICE
CERTIFICATE OF CORRECTION

PATENT NO. : 10,829,373 B2
APPLICATION NO. : 15/998894
DATED : November 10, 2020
INVENTOR(S) : Fiekens et al.

Page 1 of 1

It is certified that error appears in the above-identified patent and that said Letters Patent is hereby corrected as shown below:

On the Title Page

Item (30), add following heading and priority data information:
--Foreign Application Priority Data
February 17, 2016 (EP) ........16156070.1--

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*